US012638869B1

(12) United States Patent
Volk

(10) Patent No.: US 12,638,869 B1
(45) Date of Patent: May 26, 2026

(54) VOLTAGE REGULATOR CONTROL WITH SOFT-START AND/OR DYNAMIC VOLTAGE SCALING USING A DIGITAL RAMP GENERATOR AND LOW-PASS FILTER

(71) Applicant: KINETIC TECHNOLOGIES INTERNATIONAL HOLDINGS LP, Toronto (CA)

(72) Inventor: Karl Richard Volk, Scotts Valley, CA (US)

(73) Assignee: Kinetic Technologies International Holdings LP, Toronto (CA)

( * ) Notice: Subject to any disclaimer, the term of this patent is extended or adjusted under 35 U.S.C. 154(b) by 363 days.

(21) Appl. No.: 18/528,517

(22) Filed: Dec. 4, 2023

(51) Int. Cl.
*G05F 1/46* (2006.01)

(52) U.S. Cl.
CPC .................................... *G05F 1/46* (2013.01)

(58) Field of Classification Search
CPC ........................................................ G05F 1/46
USPC ........................................................ 323/234
See application file for complete search history.

(56) References Cited

U.S. PATENT DOCUMENTS 8,575,911 B2 * 11/2013 Cheng ................. H02M 3/1588 323/283
2008/0049465 A1 * 2/2008 Parto ....................... H02M 1/36 363/49
2021/0336542 A1 * 10/2021 Li ....................... H02M 3/1582

* cited by examiner

*Primary Examiner* — Yemane Mehari
(74) *Attorney, Agent, or Firm* — Sheppard Mullin Richter & Hampton LLP

(57) ABSTRACT

Circuits are disclosed for controlling voltage regulators. In general, one aspect disclosed features an electric circuit comprising: a digital ramp generator configured to generate a digital voltage ramp; a digital low-pass filter having an input electrically coupled to an output of the digital ramp generator and configured to low-pass filter the digital voltage ramp; a digital-to-analog converter having an input electrically coupled to an output of the digital low-pass filter and configured to generate an analog control signal based on the filtered digital voltage ramp; and a voltage regulator having an input electrically coupled to an output of the digital-to-analog converter and configured to regulate an output voltage based on the analog control signal and an input voltage of the voltage regulator.

20 Claims, 6 Drawing Sheets

300

VOLTAGE REGULATOR CONTROL WITH SOFT-START AND/OR DYNAMIC VOLTAGE SCALING USING A DIGITAL RAMP GENERATOR AND LOW-PASS FILTER

BACKGROUND

The disclosed technology relates generally to voltage regulators, and more particularly some embodiments relate to soft-start and dynamic voltage scaling in such regulators.

Voltage regulators are commonly used to provide a stable and regulated voltage output from a varying or unregulated voltage source. These regulators are essential components in many electronic circuits and systems where a consistent voltage level is required for proper operation. Voltage regulators typically have a specified output voltage, which can be fixed or adjustable.

Voltage regulators are used in a wide range of applications, including power supplies for electronic devices and circuits, battery charging circuits, automotive voltage regulation, voltage stabilization in microcontrollers and microprocessors, radio and audio equipment to maintain a constant signal level, and solar power systems to maintain a consistent output voltage.

Many modern voltage regulators include protection features like overvoltage protection, overcurrent protection, and thermal shutdown to prevent damage to the regulator and connected devices. Some regulators include soft-start and dynamic voltage scaling (DVS). Soft-start prevents in-rush current and reduces output overshoot when ramping from zero to a target regulation level. DVS optimizes the regulation level to match the various operating modes of a system (e.g., a varying load). DVS is especially common when the load is a microprocessor core.

A common technique for soft-start and DVS is to generate a linear ramp to control the regulator's output. The linear ramp may be implemented with analog circuitry or digital circuitry. However, regulators commonly use digital circuitry when they include a digital control interface for setting the regulator's output level, soft-start ramp-rate, and/or DVS ramp-rate.

SUMMARY

The disclosed voltage regulators mitigate regulator output overshoot and/or undershoot when ramping the output of a regulator up and/or down, respectively. Generally, overshoot and undershoot are considered undesirable for the safe operation of system loads, especially microprocessor cores. With less overshoot and/or undershoot, the regulator's output settles more quickly to its target regulation level. Therefore the output power is ready for use sooner, thereby enhancing the overall performance of the system.

In general, one aspect disclosed features an electric circuit comprising: a digital ramp generator, usually in the form of a digital up/down counter; a digital low-pass filter having an input electrically coupled to an output of the digital ramp generator and configured to low-pass filter the digital ramp; a digital-to-analog converter having an input electrically coupled to an output of the digital low-pass filter and configured to generate an analog control signal based on the filtered digital ramp; and a voltage regulator having an input electrically coupled to an output of the digital-to-analog converter and configured to regulate an output voltage based on the analog control signal and an input voltage of the voltage regulator.

Embodiments of the electric circuit may include one or more of the following features. Some embodiments comprise one or more registers, wherein the digital ramp generator is further configured to generate the digital ramp at a ramp rate based on one or more values stored in the one or more registers. In some embodiments, the ramp rate is fixed or adjustable. Some embodiments comprise one or more registers, wherein a corner frequency of the digital low-pass filter is set based on one or more values stored in the one or more registers. In some embodiments, the digital low-pass filter operates synchronously with the digital ramp generator. Some embodiments comprise a clock generator configured to provide a clock signal to the digital ramp generator and the digital low-pass filter. Some embodiments comprise one or more registers, wherein the clock generator is further configured to provide the clock signal based on one or more values stored in the one or more registers.

Another aspect disclosed features an electric circuit comprising: a digital ramp generator, usually in the form of a digital up/down counter; a digital-to-analog converter having an input electrically coupled to an output of the digital ramp generator and configured to convert the digital ramp to an analog voltage ramp; an analog low-pass filter having an input electrically coupled to an output of the digital-to-analog converter and configured to generate an analog control signal by low-pass filtering the analog voltage ramp; and a voltage regulator having an input electrically coupled to an output of the analog low-pass filter and configured to regulate an output voltage based on the analog control signal and an input voltage of the voltage regulator.

Embodiments of the system may include one or more of the following features. In some embodiments, the analog low-pass filter is at least one of: a switched-capacitor low-pass filter; an R-C passive filter; and an active filter. Some embodiments comprise a clock generator configured to provide a clock signal to the digital ramp generator and the switched-capacitor low-pass filter. Some embodiments comprise one or more registers, wherein the clock generator is further configured to provide the clock signal based on data stored in the one or more registers. Some embodiments comprise a digital interface configured to load the data into the one or more registers. Some embodiments comprise one or more registers, wherein the digital ramp generator is further configured to generate the digital ramp based on data stored in the one or more registers. In some embodiments, the voltage regulator comprises: a regulator power stage configured to accept an input voltage and regulate the output voltage based on a control signal; a feedback circuit configured to provide a feedback signal based on the regulated output voltage; and an error amplifier circuit configured to generate the regulator error signal based on the feedback signal and the analog control signal.

A further aspect disclosed features an electric circuit comprising: a memory configured to store data representing a non-linear digital ramp, and to output the data in accordance with a clock signal; a digital scaler having an input electrically coupled to an output of the memory and configured to scale the data according to a scale factor; a digital-to-analog converter having an input electrically coupled to an output of the digital scaler and configured to convert the scaled data to an analog control signal; and a voltage regulator having an input electrically coupled to an output of the digital-to-analog converter and configured to regulate an output voltage based on the analog control signal and an input voltage of the voltage regulator.

Embodiments of the electric circuit may include one or more of the following features. Some embodiments comprise a clock generator configured to provide the clock signal. Some embodiments comprise one or more registers, wherein the clock generator is further configured to provide the clock signal based on second data stored in the one or more registers. Some embodiments comprise a digital interface configured to load the second data into the one or more registers. Some embodiments comprise one or more registers, wherein the digital scaler is further configured to scale the data based on one or more scale factors stored in the one or more registers. In some embodiments, the voltage regulator comprises: a regulator power stage configured to accept an input voltage and regulate the output voltage based on a regulator control signal; a feedback circuit configured to provide a feedback signal based on the regulated output voltage; and an error amplifier circuit configured to generate the regulator control signal based on the feedback signal and the analog control signal.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Conventional regulators use linear ramps (i.e., ramps with a constant ramp-rate) to control soft-start and/or DVS. The problem with a linear ramp is that most regulators include an integrating error amplifier in their closed-loop feedback control to improve regulation accuracy. Because the linear ramp has an abrupt start and an abrupt end, the integrating control falls behind at the beginning of the ramp, then nearly catches up during the ramp, and then overshoots or undershoots the final regulation level at the end of the ramp before settling. Regulator control loops with proportional and integrating control (PI), and even those with proportional, integrating, and differential control (PID), can only reduce the magnitude of overshoot/undershoot when critically damped. However, they cannot easily eliminate it, unless very over-damped. Generally, overshoot and undershoot are considered undesirable for the safe operation of system loads, especially microprocessor cores.

The disclosed voltage regulators mitigate this overshoot and/or undershoot by rounding the sharp corners at the start and end of the ramp. In some embodiments, this rounding is achieved by filtering the ramp with a low-pass filter. In other embodiments, this rounding is achieved by storing a digital representation of a ramp with rounded corners and scaling that ramp as needed. With less overshoot and/or undershoot, the regulator's output settles more quickly to its target regulation level. Therefore the output power is ready for use sooner, thereby enhancing the overall performance of the system.

Figure 1:
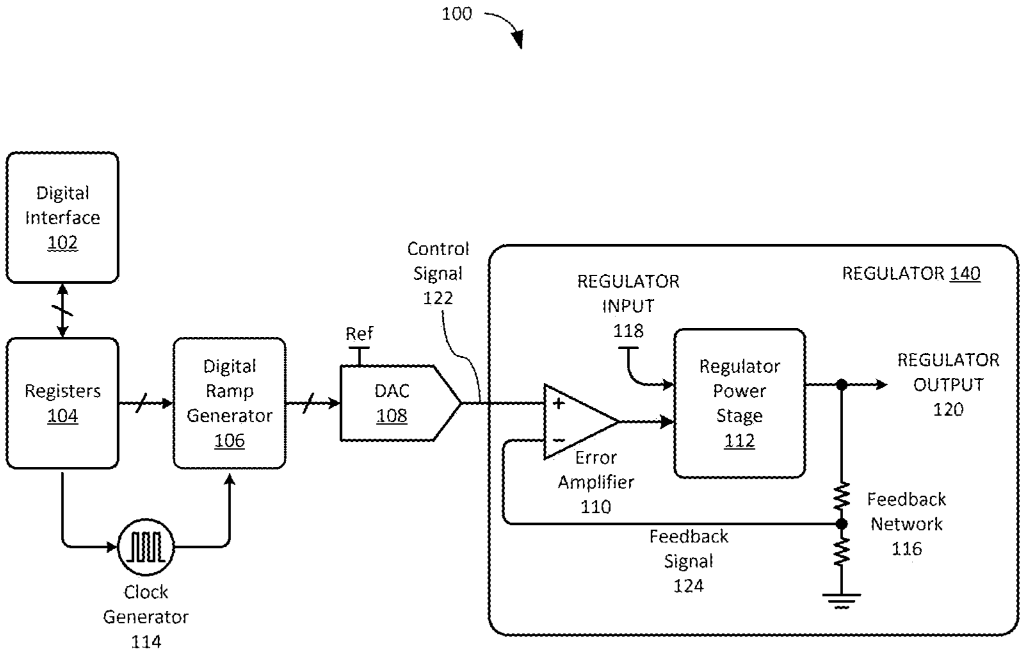
FIG. 1 a prior art voltage regulation system using a digital ramp generator followed by a digital-to-analog converter (DAC) to generate a control signal for a voltage regulator, specifically for the purposes of soft-start and/or dynamic voltage scaling (DVS).

FIG. 1 illustrates a prior art voltage regulation system 100 using a digital ramp generator 106 followed by a digital-to-analog converter (DAC) 108 to generate a control signal 122 for a voltage regulator 140, specifically for the purposes of soft-start and/or dynamic voltage scaling (DVS). A digital interface 102 may be electrically coupled by a bus to registers 104. Outputs of the registers 104 may be electrically coupled to inputs of a digital ramp generator 106 and a clock generator 114. An output of the clock generator 114 may be electrically coupled to a clock input of the digital ramp generator 106. Outputs of the digital ramp generator 106 may be electrically coupled to inputs of the DAC 108. Output of the DAC 108 may be electrically coupled to the voltage regulator 140.

The voltage regulator 140 may include an error amplifier 110, a regulator power stage 112, and a feedback network 116. Output of the voltage regulator 140 may be electrically coupled to an input of the feedback network 116. Output of the feedback network 116 may be electrically coupled to a negative input of the error amplifier 110. Output of the DAC 108 may be electrically coupled to a positive input of the error amplifier 110. Output of the error amplifier 110 may be electrically coupled to a control input of the regulator power stage 112.

The digital ramp generator 106 may include a digital counter to generate the ramp. For DVS, the ramp may be up or down; therefore, a digital up/down counter is used. The digital ramp generator 106 may include a digital comparator that determines when the counter matches the target regulation setting, which may be stored in registers 104. When the counter matches the target regulation setting, the digital ramp is ended. The digital ramp-rate may be fixed or adjustable, and may be controlled by a clock generator 114 in accordance with data stored in the registers 104. Data may be stored in the registers using a digital interface 102.

The regulator input 118 is accepted by the regulator power stage 112 to provide a regulated output at the regulator output 120 in accordance with a regulator error signal provided by the error amplifier 110. The error amplifier 110 generates the regulator error signal based on the control signal 122 and a feedback signal 124. The feedback signal 124 is generated by the feedback network 116 based on the regulator output 120. The feedback network 116 may be implemented as a resistor divider as shown in FIG. 1.

Figure 2:
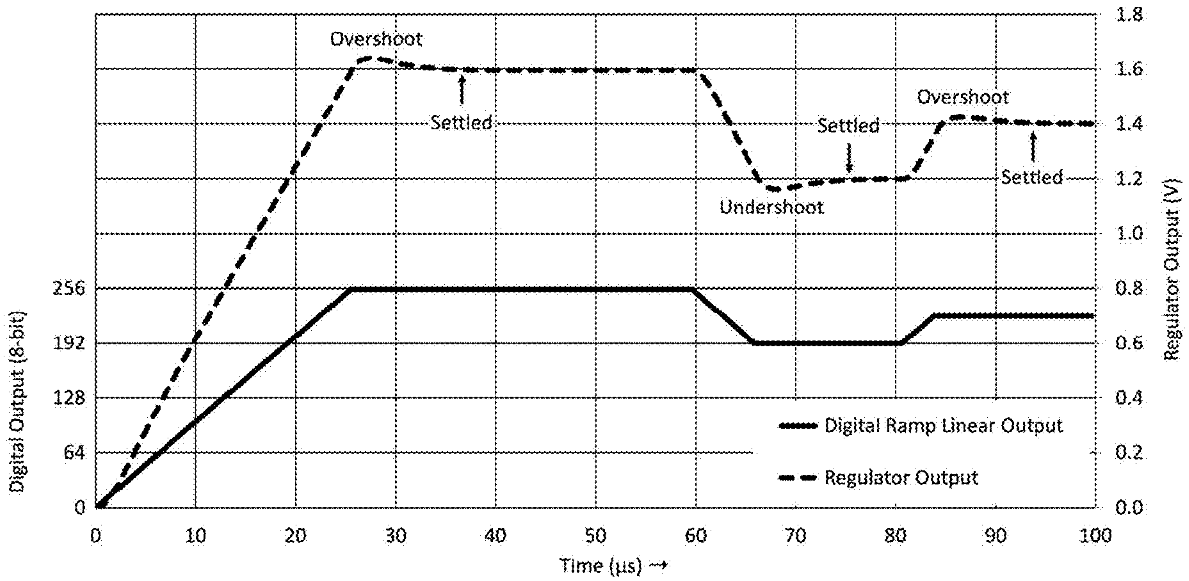
FIG. 2 illustrates simulated waveforms for the prior art voltage regulation system of FIG. 1.

FIG. 2 illustrates simulated waveforms for the prior art voltage regulation system 100 of FIG. 1. The output of the digital ramp generator 106 is shown as a solid line. The regulator output 120 is shown as a dashed line. As can be seen in FIG. 2, the regulator output 120 exhibits overshoot and undershoot, as well as delayed settling. Generally, overshoot and undershoot are considered undesirable for the safe operation of system loads, especially microprocessor cores. With overshoot and/or undershoot, the regulator output 120 exhibits delayed settling to its target regulation level, meaning the output power is not ready for use until some extra time after the corresponding ramp has ended, thereby reducing the overall performance of the system.

Figure 3:
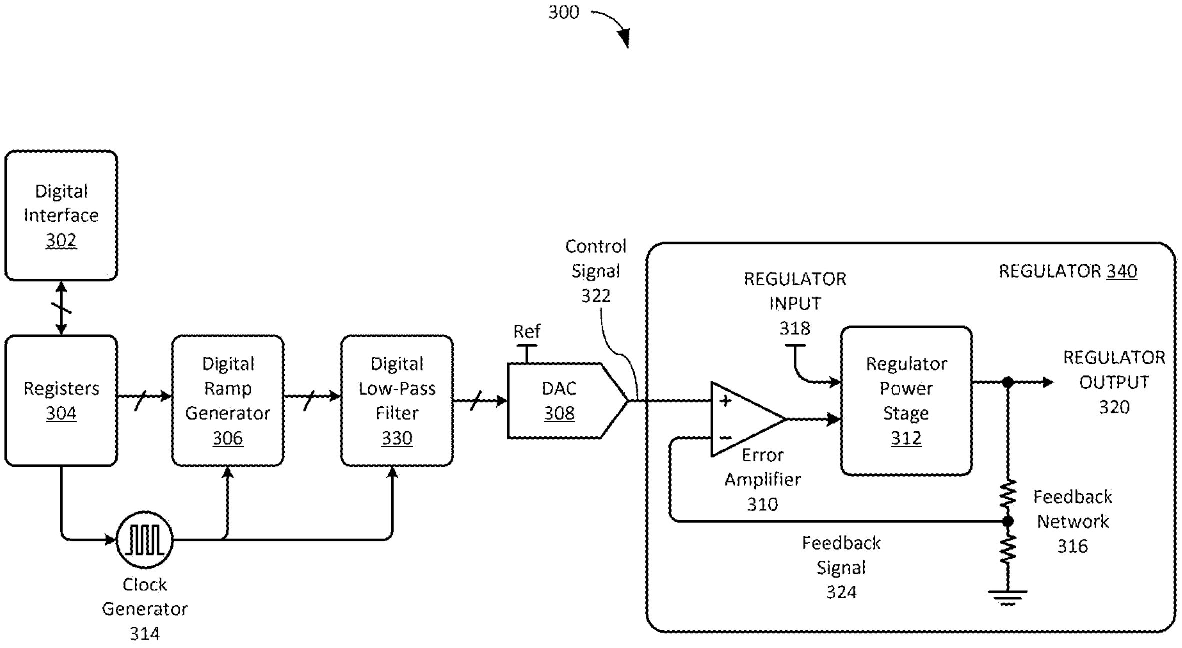
FIG. 3 illustrates a voltage regulation system using a digital ramp generator followed by a digital low-pass filter and then a digital-to-analog converter (DAC) for soft-start and/or DVS according to some embodiments of the disclosed technology.

FIG. 3 illustrates a voltage regulation system 300 using a digital ramp generator 306 followed by a digital low-pass filter 330 and then a digital-to-analog converter (DAC) 308 for soft-start and/or DVS according to some embodiments of the disclosed technology. A digital interface 302 may be electrically coupled by a bus to registers 304. Outputs of the registers 304 may be electrically coupled to inputs of a digital ramp generator 306 and a clock generator 314. Output of the clock generator 314 may be electrically coupled to a clock input of the digital ramp generator 306 and a clock input of the digital low-pass filter 330. Outputs of the digital ramp generator 306 may be electrically coupled to inputs of the digital low-pass filter 330. Outputs of the digital low-pass filter 330 may be electrically coupled to inputs of a DAC 308. Output of the DAC 308 may be electrically coupled to a control input of the voltage regulator 340.

The voltage regulator 340 may include an error amplifier 310, a regulator power stage 312, and a feedback network 316. Output of the voltage regulator 340 may be electrically coupled to an input of the feedback network 316. Output of the feedback network 316 may be electrically coupled to a negative input of the error amplifier 310. Output of the DAC 308 may be electrically coupled to a positive input of the error amplifier 310. Output of the error amplifier 310 may be electrically coupled to a control input of the regulator power stage 312.

The digital low-pass filter 330 may be implemented as a conventional digital low-pass filter. The digital interface 302, registers 304, digital ramp generator 306, DAC 308, clock generator 314, and regulator 340 may operate as described above for corresponding elements of FIG. 1.

The digital low-pass filter 330 may be implemented as a first-order filter, a second-order, or a higher-order filter. The corner frequency of the digital low-pass filter 330, also referred to as the smoothing strength, may be fixed or adjustable, and may be set by storing corresponding values in the registers 304. In some embodiments, the digital low-pass filter 330 may operate synchronously with the digital ramp generator 306 by sharing the same clock signal or a multiple or division of that same clock signal. In some embodiments, the digital low-pass filter 330 and the digital ramp generator 306 may run asynchronously (e.g., on independent clocks). The digital low-pass filter 330 removes the abrupt start and end of the linear ramp generated by digital ramp generator 306, as seen in FIG. 4 and described below.

In some embodiments, the performance of the system 300 may be improved by tuning the digital low-pass filter 330 to match the compensation and loop dynamics of the regulator 340. Adding the digital low-pass filter 330 does require more circuitry, which comes with additional size and cost. Fortunately, a digital low-pass filter is extremely small and inexpensive when integrated into a semiconductor regulator or controller integrated circuit.

Figure 4:
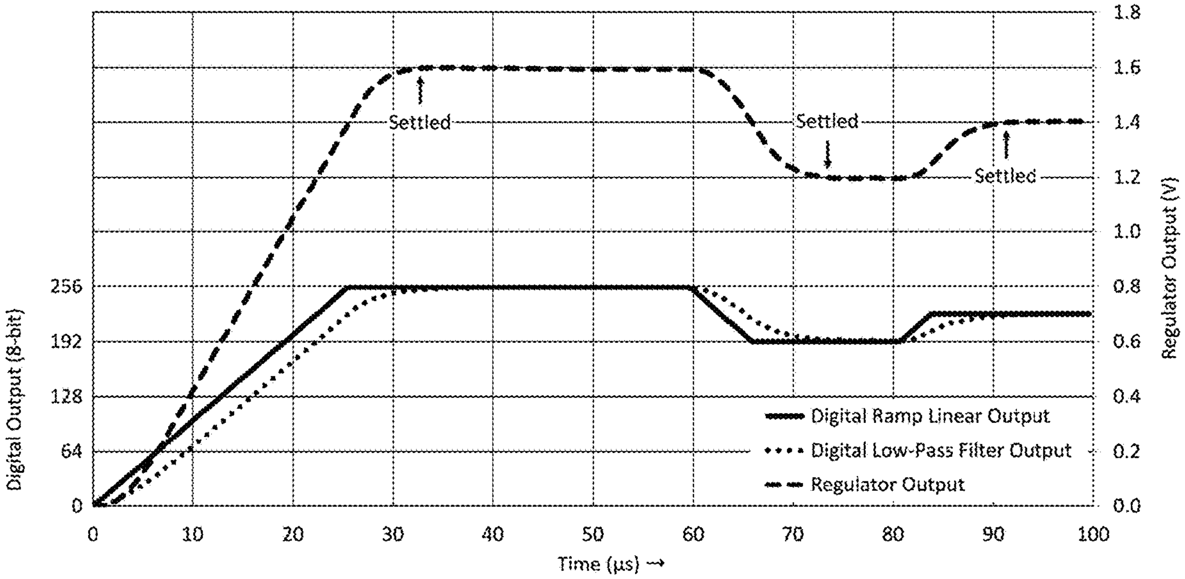
FIG. 4 illustrates simulated waveforms for the voltage regulation system of FIG. 3.

FIG. 4 illustrates simulated waveforms for the voltage regulation system 300 of FIG. 3. The output of the digital ramp generator 306 is shown as a solid line. The output of the digital low-pass filter 330 is shown as a dotted line. The regulator output 320 is shown as a dashed line. As can be seen in FIG. 4, the regulator output 320 exhibits little or no overshoot/undershoot and less-delayed settling for the regulator's output when compared with conventional regulator systems. Without overshoot and undershoot, the regulator output is considered safer for the operation of system loads, especially microprocessor cores. And without overshoot and/or undershoot, the regulator's output exhibits less-delayed settling to its target regulation level, meaning the output power is ready for use sooner after the ramp has ended, thereby increasing the overall performance of the system.

Figure 5:
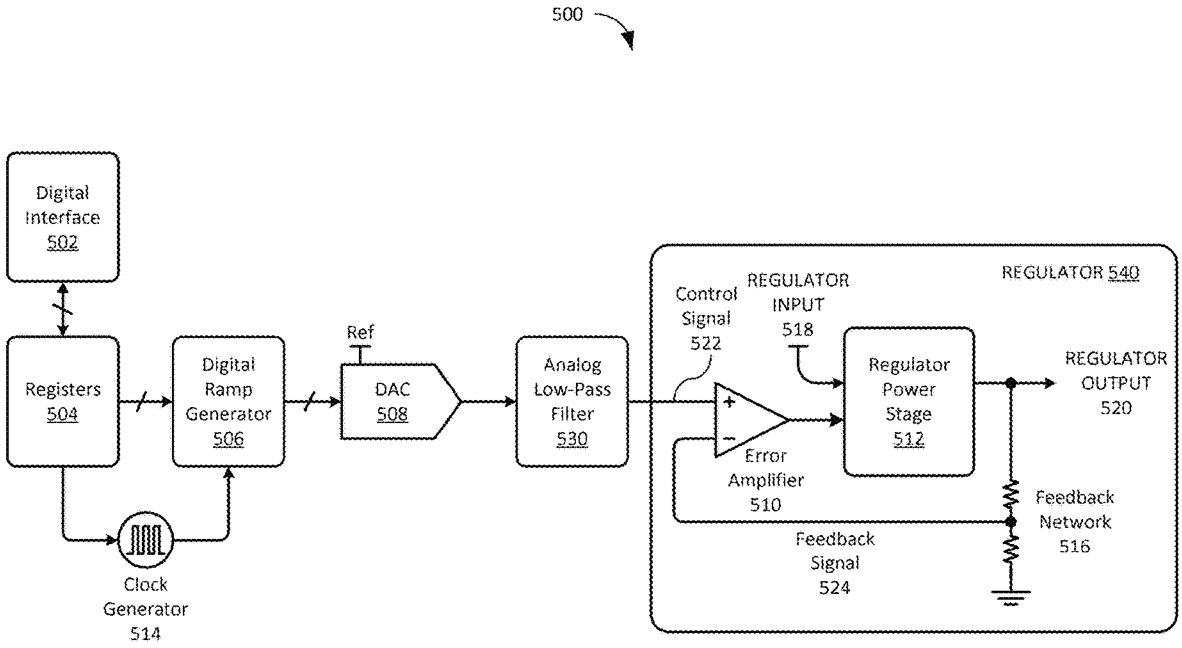
FIG. 5 illustrates a voltage regulation system using a digital ramp generator followed by a digital-to-analog converter (DAC) and then an analog low-pass filter for soft-start and/or DVS according to some embodiments of the disclosed technology.

FIG. 5 illustrates a voltage regulation system 500 using a digital ramp generator 506 followed by a digital-to-analog converter (DAC) 508 and then an analog low-pass filter 530 for soft-start and/or DVS according to some embodiments of the disclosed technology. In this arrangement, the DAC 508 is placed between the digital ramp generator and the analog low-pass filter 530. A digital interface 502 may be electrically coupled by a bus to registers 504. Outputs of the registers 504 may be electrically coupled to inputs of a digital ramp generator 506 and a clock generator 514. Output of the clock generator 514 may be electrically coupled to a clock input of the digital ramp generator 506. Outputs of the digital ramp generator 506 may be electrically coupled to inputs of the DAC 508. Outputs of the DAC 508 may be electrically coupled to inputs of the analog low-pass filter 530. Output of the analog low-pass filter 530 may be electrically coupled to a control input of the voltage regulator 540.

The voltage regulator 540 may include an error amplifier 510, a regulator power stage 512, and a feedback network 516. Output of the voltage regulator 540 may be electrically coupled to an input of the feedback network 516. Output of the feedback network 516 may be electrically coupled to a negative input of the error amplifier 510. Output of the analog low-pass filter 530 may be electrically coupled to a positive input of the error amplifier 510. Output of the error amplifier 510 may be electrically coupled to a control input of the regulator power stage 512.

The digital interface 502, registers 504, digital ramp generator 506, DAC 508, clock generator 514, and regulator 540 may operate as described above for corresponding elements of FIGS. 1 and 3.

In some embodiments, the analog low-pass filter 530 is implemented as a switched capacitor low-pass filter. In such embodiments, the switched capacitor low-pass filter may operate according to the clock signal provided by the clock generator 514. In some embodiments, the analog low-pass filter 530 is implemented as a passive R-C low-pass filter. In some embodiments, the analog low-pass filter 530 is implemented as an active low-pass filter.

Figure 6:
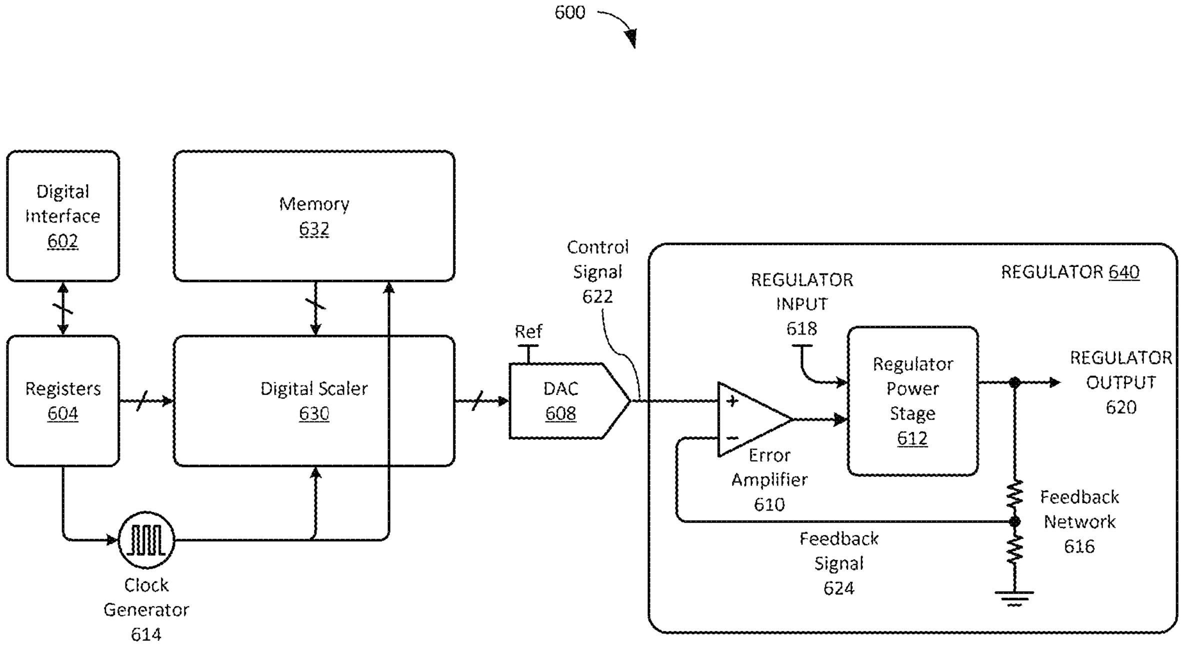
FIG. 6 illustrates a voltage regulation system using a memory and a digital scaler followed by a digital-to-analog converter (DAC) for soft-start and/or DVS according to some embodiments of the disclosed technology.

FIG. 6 illustrates a voltage regulation system 600 using a memory 632 and a digital scaler 630 followed by a digital-to-analog converter (DAC) 608 for soft-start and/or DVS according to some embodiments of the disclosed technology. In this arrangement, the DAC 608 is placed between the regulator 640 and the other elements of the voltage regulation system 600.

A digital interface 602 may be electrically coupled by a bus to registers 604. Outputs of the registers 604 may be electrically coupled to inputs of a digital scaler 630 and a clock generator 614. Output of the clock generator 614 may be electrically coupled to a clock input of the digital scaler 630 and a clock input of the memory 632. Outputs of the digital scaler 630 may be electrically coupled to inputs of the DAC 608. Output of the DAC 608 may be electrically coupled to a control input of the voltage regulator 640.

The voltage regulator 640 may include an error amplifier 610, a regulator power stage 612, and a feedback network 616. Output of the voltage regulator 640 may be electrically coupled to an input of the feedback network 616. Output of the feedback network 616 may be electrically coupled to a negative input of the error amplifier 610. Output of the DAC 608 may be electrically coupled to a positive input of the error amplifier 610. Output of the error amplifier 610 may be electrically coupled to a control input of the regulator power stage 612.

The memory 632 may be implemented as a read-only memory (ROM). The digital interface 602, registers 604, DAC 608, clock generator 614, and regulator 640 may operate as described above for corresponding elements of FIGS. 1, 3, and 5.

Data representing a non-linear ramp may be stored in the memory 632. The data stored in the memory 632 may be provided to the digital scaler 630. The digital scaler 630 may scale the provided data according to one or more scale factors. For example, the digital scaler 630 may scale the duration of the ramp and/or magnitude of the ramp. The one or more scale factors may be stored in the registers 604. The scaled data may be provided to the DAC 608. The memory 632 and the digital scaler 630 may be clocked by the clock generator 614.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalents.

What is claimed is:

1. An electric circuit comprising:

a digital ramp generator configured to generate a digital voltage ramp;

a digital low-pass filter having an input electrically coupled to an output of the digital ramp generator and configured to low-pass filter the digital voltage ramp;

a digital-to-analog converter having an input electrically coupled to an output of the digital low-pass filter and configured to generate an analog control signal based on the filtered digital voltage ramp; and a voltage regulator having an input electrically coupled to an output of the digital-to-analog converter and configured to regulate an output voltage based on the analog control signal and an input voltage of the voltage regulator.

2. The electric circuit of claim 1, further comprising:

one or more registers, wherein the digital ramp generator is further configured to generate the digital voltage ramp at a ramp rate based on one or more values stored in the one or more registers.

3. The electric circuit of claim 1, wherein:

the ramp rate is fixed or adjustable.

4. The electric circuit of claim 1, further comprising:

one or more registers, wherein a corner frequency of the digital low-pass filter is set based on one or more values stored in the one or more registers.

5. The electric circuit of claim 1, wherein:

the digital low-pass filter operates synchronously or asynchronously with the digital ramp generator.

6. The electric circuit of claim 5, further comprising:

a clock generator configured to provide a clock signal to the digital ramp generator and the digital low-pass filter.

7. The electric circuit of claim 5, further comprising:

a clock generator configured to provide a clock signal to the digital ramp generator and the digital low-pass filter; and one or more registers, wherein the clock generator is further configured to provide the clock signal based on one or more values stored in the one or more registers.

8. An electric circuit comprising:

a digital ramp generator configured to generate a digital voltage ramp;

a digital-to-analog converter having an input electrically coupled to an output of the digital ramp generator and configured to convert the digital voltage ramp to an analog voltage ramp;

an analog low-pass filter having an input electrically coupled to an output of the digital-to-analog converter and configured to generate an analog control signal by low-pass filtering the analog voltage ramp; and a voltage regulator having an input electrically coupled to an output of the analog low-pass filter and configured to regulate an output voltage based on the analog control signal and an input voltage of the voltage regulator.

9. The electric circuit of claim 8, wherein the analog low-pass filter is at least one of:

a switched-capacitor low-pass filter;

a passive resistor-capacitor (R-C) filter; and an active low-pass filter.

10. The electric circuit of claim 8, further comprising:

a clock generator configured to provide a clock signal to the digital ramp generator.

11. The electric circuit of claim 8, further comprising:

a clock generator configured to provide a clock signal to the digital ramp generator; and one or more registers, wherein the clock generator is further configured to provide the clock signal based on data stored in the one or more registers.

12. The electric circuit of claim 11, further comprising:

a digital interface configured to load the data into the one or more registers.

13. The electric circuit of claim 8, further comprising:

one or more registers, wherein the digital ramp generator is further configured to generate the digital voltage ramp based on data stored in the one or more registers.

14. The electric circuit of claim 8, wherein the voltage regulator comprises:

a regulator power stage configured to regulate the input voltage as a regulated output voltage based on a regulator control signal;

a feedback circuit configured to provide a feedback signal based on the regulated output voltage; and an error amplifier circuit configured to generate the regulator control signal based on the feedback signal and the analog control signal.

15. An electric circuit comprising:

a memory configured to store data representing a non-linear digital voltage ramp, and to output the data in accordance with a clock signal;

a digital scaler having an input electrically coupled to an output of the memory and configured to scale the data according to a scale factor;

a digital-to-analog converter having an input electrically coupled to an output of the digital scaler and configured to convert the scaled data to an analog control signal; and a voltage regulator having an input electrically coupled to an output of the digital-to-analog converter and configured to regulate an output voltage based on the analog control signal and an input voltage of the voltage regulator.

16. The electric circuit of claim 15, further comprising:

a clock generator configured to provide the clock signal.

17. The electric circuit of claim 15, further comprising:

a clock generator configured to provide the clock signal; and one or more registers, wherein the clock generator is further configured to provide the clock signal based on second data stored in the one or more registers.

18. The electric circuit of claim 17, further comprising:

a digital interface configured to load the second data into the one or more registers.

19. The electric circuit of claim 15, further comprising:

one or more registers, wherein the digital scaler is further configured to scale the data based on one or more scale factors stored in the one or more registers.

20. The electric circuit of claim 15, wherein the voltage regulator comprises:

a regulator power stage configured to regulate the input voltage as a regulated output voltage based on a regulator control signal;

a feedback circuit configured to provide a feedback signal based on the regulated output voltage; and an error amplifier circuit configured to generate the regulator control signal based on the feedback signal and the analog control signal.

* * * * *